United States Patent [19]
Bailes et al.

[11] Patent Number: 4,747,921
[45] Date of Patent: May 31, 1988

[54] LIQUID-LIQUID CONTACTING

[75] Inventors: Philip J. Bailes, Baildon; Edmund H. Stitt, Hebden Bridge, both of England

[73] Assignee: University of Bradford, Bradford, England

[21] Appl. No.: 17,255

[22] PCT Filed: Mar. 10, 1986

[86] PCT No.: PCT/GB86/00133
§ 371 Date: Jan. 6, 1987
§ 102(e) Date: Jan. 6, 1987

[87] PCT Pub. No.: WO86/05115
PCT Pub. Date: Sep. 12, 1986

[30] Foreign Application Priority Data
Mar. 9, 1985 [GB] United Kingdom ............... 8506161
Apr. 4, 1985 [GB] United Kingdom ............... 8508889

[51] Int. Cl.⁴ .......................................... B01D 11/04
[52] U.S. Cl. ................................. 204/186; 204/307
[58] Field of Search ................... 204/186, 302, 307

[56] References Cited
U.S. PATENT DOCUMENTS
2,395,011  2/1946  Perkins ............................... 204/190
4,161,439  7/1979  Warren ............................... 204/306

FOREIGN PATENT DOCUMENTS
2103460  4/1972  France ............................... 204/186

OTHER PUBLICATIONS
Chemie-Ing.-Techn., vol. 35, No. 12, 1963, pp. 851-853.

Primary Examiner—T. M. Tufariello
Attorney, Agent, or Firm—Mason, Kolehmainen, Rathburn & Wyss

[57]  ABSTRACT

A method for effecting enhanced contact between two immiscible liquid of different electrical conductivities comprises applying both intense mechanical agitation (1) and, in an immediately adjacent zone, a varying electrostatic field (2), in order to effect rapid change of their liquid-liquid interfaces but maintaining droplet size of a desirably high magnitude at least outside the zone of the intense agitation. The method may be applied to, for instance, liquid-liquid extraction. Apparatus is also described.

13 Claims, 7 Drawing Sheets

LIQUID-LIQUID CONTACTING

This invention relates to methods and apparatus for effecting liquid-liquid contact, for instance in the field of liquid-liquid extraction.

The invention involves the simultaneous use of high voltage fields and high shear mixing to promote coalescence and redispersion, respectively, when there is differential contact between two liquid phases. More particularly, the invention relates to applying a form of DC or AC voltage to an insulation coated electrode that is concentric with, but displaced on the central axis from, a high shear mixer at earth potential such that an electrostatic field is generated between the ring, electrode and the mixer assembly. The electrostatic field causes coalescence of the drops leaving the mixer thereby permitting high speed mixing and rapid creation of new interface without the production of very small drops that normally renders such an approach unacceptable.

According to the present invention there is provided a method for effecting contact between two immiscible liquids having different electrical conductivities, the method comprising providing contact between the two liquids wherein the relatively more conducting liquid is dispersed within the less conducting liquid characterised in that th liquids are subjected to intense mechanical agitation in a first zone to reduce the droplet size of the dispersed phase and, at least in a second, immediately adjacent zone, to a varying electrostatic field to cause coalescence of the droplets, whereby the liquid-liquid interfaces undergo rapid changes and droplet size is maintained at a desirably high magnitude at least outside said first zone.

The present invention also provides apparatus for effecting contact between two immiscible liquids having different elecrical conductivities, the apparatus comprising means for effecting contact between two immiscible liquids having different electrical conductivities wherein the relatively more conducting liquid is dispersed within the less conducting liquid characterised in that the apparatus includes means for subjecting the liquids to intense mechanical agitation in a first zone to reduce the droplet size of the dispersed phase, and means for applying, in a second, immediately adjacent zone, a varying electrostatic field to cause coalescence of the droplets, said agitation means and said means for applying an electrostatic field being such that the liquid-liquid interfaces undergo rapid changes and droplet size is maintained at a desirably high magnitude at least outside said first zone.

In a preferred arrangement of apparatus of the invention, a drive shaft along the central axis facilitates multiple arrangements of the mixer and electrode assemblies in a manner analogous to that found with rotors and stators in mechanically agitated liquid-liquid extraction columns such as the Rotating Disc Contactor, Kuhni column and Oldeshue-Rushton column.

In liquid-liquid extraction a solute is transferred from one liquid solvent to another across the phase boundary. Distribution data give information on concentration levels in the conjugate phases at equilibrium but provide no indication of the rate at which this equilibrium is established. When two liquid phases are contacted which contain a solute at such concentration levels that the ratio is not equal to the distribution coefficient, the solute will transfer between the two phases until its chemical potential becomes the same in each phase. Industrial equipment for liquid-liquid extraction can be classified into two groups, depending on the way this concentration driving force is arranged in practice. The terms used to describe the two categories are differential and stagewise contators.

A stagewise contactor provides a number of discrete stages in which the two phases are brought to equilibrium, separated, and passed countercurrent to the adjoining stages. In contrast, a differential contactor provides continuous coutercurrent contact between the two phases; such that the concentration profiles of the two phases ensure that a driving force for mass transfer is sustained throughout their length. Equilibrium should not be established between the phases at any point in a differential contactor. Mixer-settlers typify stagewise equipment; extraction columns are the most common way of achieving differential contact.

It is evident from the foregoing that bulk phase separation is a necessary and frequent requirement in a stagewise contactor, whereas, under true differential conditions it only occurs once, at the point where the drops coalesce with their homophase having travelled the length of the contactor. It follows from this that methods of accelerating liquid bulk phase separation are likely to result in considerable savings in equipment size and liquid inventory in stagewise equipment more so than in differential equipment. For this reason the use of electric fields to promote liquid phase separation has been largely confined to applications involving stagewise equipment. The technique may only be used for water-in-oil type dispersions since it is necessary to establish the electric field in the continuous phase.

Patents describing the technology are not confined to liquid-liquid extraction; they also cover emulsion breaking in liquid membrane processes (U.S. Pat. Nos. 4,283,290, 4,415,426) and crude oil emulsion treatment (U.S. Pat. Nos. 987,114, 3,847,775, 4,056,451, 4,226,690). Typical examples referring to liquid-liquid extraction systems are: U.S. Pat. No. 4,039,404, in which the dispersion passing from mixer to settler is subjected to an AC field to promote coalescence between drops to enhance bulk phase separation; U.S. Pat. No. 4,120,769, where fluctuating unidirectional fields are used to aid phase separation in a stagewise liquid-liquid extraction operation; European Patent Application No. 81305155.4 in which pulsed DC fields and insulated electrodes are shown to enhance phase separation in water-in-oil type dispersions containing 50% dispersed phase.

There would seem to be little advantage in applying this electrical technology to a differential contactor except in circumstances where coalescence of drop at the bulk phase interface was sufficiently slow for this to represent a limit to column operation. In such a case it is conceivable that the formation of a dispersion band could be discouraged by the application of an electric field at the bulk interface.

The purpose of the present invention is to employ an electric field to improve the performance of a differential contactor by means other than promoting liquid phase separation at a bulk interface. The invention includes the concept that an electric field can be used to counteract the undesirable effects associated with droplet disintegration in highly agitated systems. Independent control of the electrical factors causing coalescence and, the mixing that creates drop breakage, allows one to be balanced against the other optimum hydrodynamic and mass transfer performance. The invention uses electrostatic coalescence in opposition to vigorous agitation to promote the drop coalescence-redispersion process.

The importance of the coalescence-redispersion process becomes apparent if the factors that govern the mass transfer performance of differential contactors are considered in detail. Thus, the rate of mass transfer is determined by the interfacial area, the concentration driving force and the turbulence levels in the system. The way to maximise the interfacial area is to disperse one phase in the other as finely as possible. Unfortunately, small drops move slowly under gravity and they have stagnant interiors. The former property ultimately places a limitation on throughput, the lack of turbulence will increase the diffusional resistance within the drops. It has long been recognised, however, that the highest rates of mass transfer occur at newly formed interfaces or in the case where the interface can be considered to be undergoing surface renewal. For example, experiments on single drops have shown that the large extent to which mass transfer occurs during drop formation at a nozzle makes this the most significant part of its history. (Sherwood, Evans, Longcor, Trans.AIChE, 35 (1939) 597; Garner, Skelland, Ind.Eng.Chem., 46 (1954) 1255). Theoretical studies based on surface renewal (Higbie, Trans.AIChE., 31 (1935) 365; Danckwerts, Ind.Eng.Chem., 43 (1951) 1460) or surface stretch (Angelo, Lightfoot, Howard, AIChE.Jl., 12 (1966) 751) are often the only way of predicting the high mass transfer coefficients observed in turbulent systems.

It is desirable, therefore, to create continuously large areas of new interface between two phases as they pass countercurrently to one another. Furthermore, it is helpful to the transport of material across such an interface if turbulent conditions exist in both phases. High shear mixing is a means of generating extensive new surface and high turbulence levels. The problem with high shear mixing on its own is that too many small drops are produced and the advantages are ultimately outweighed by the resultant restriction on throughput. This difficulty is resolved if an electric field is used to induce coalescence between small drops as soon as possible after they leave the intense mixing zone.

Although the invention is described in terms of a differential liquid-liquid extractor this should not be seen as limiting the scope of the present invention. The concept of simultaneous application of vigorous agitation and electric fields to control the coalescence-redispersion process and hence drop diameters, their size distribution and turbulence is equally applicable to single stage units and to liquid-liquid contacting in general.

Furthermore, the invention may be applied in areas other than liquid-liquid extraction. By way of examples, the invention may be employed in direct contact heat transfer and in reacting systems involving the control of drop size, for example, where micro-encapsulated drops are being generated.

For an electric field to augment coalescence between drops it must be possible to establish the field in the continuous phase. The method, therefore, requires that the continuous liquid is an electrical insulator. Furthermore, the large fractional columetric hold-up dispersed phase in the inter-electrode region makes it necessary to insulate the high voltage electrode from the dispersion. The electric field may be either high voltage AC or pulsed DC.

The mechanical agitation should be such that turbulent mixing is effected, that is, non-laminar flow conditions prevail in the zone of intense mixing.

An embodiment of the invention will now be described, by way of example only, with reference to the accompanying drawings, in which.

The present invention will be disclosed by description of a specific embodiment.

Figure 1:
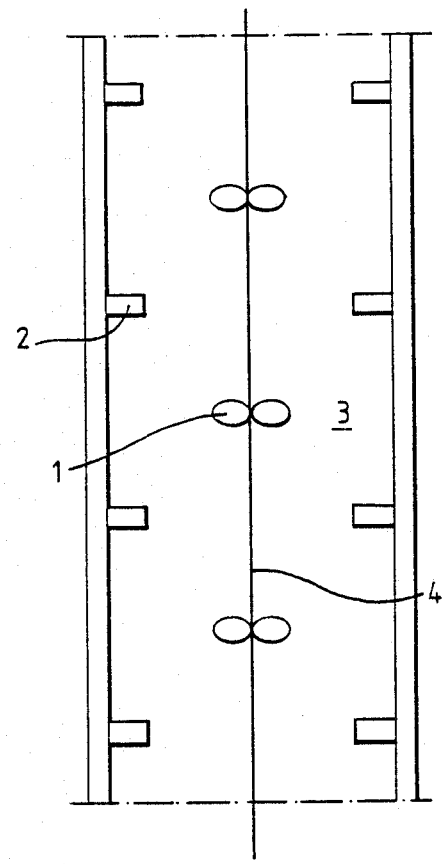
FIG. 1 is a schematic illustration of a differential column contactor in accordance with the present invention.
Figure 2:
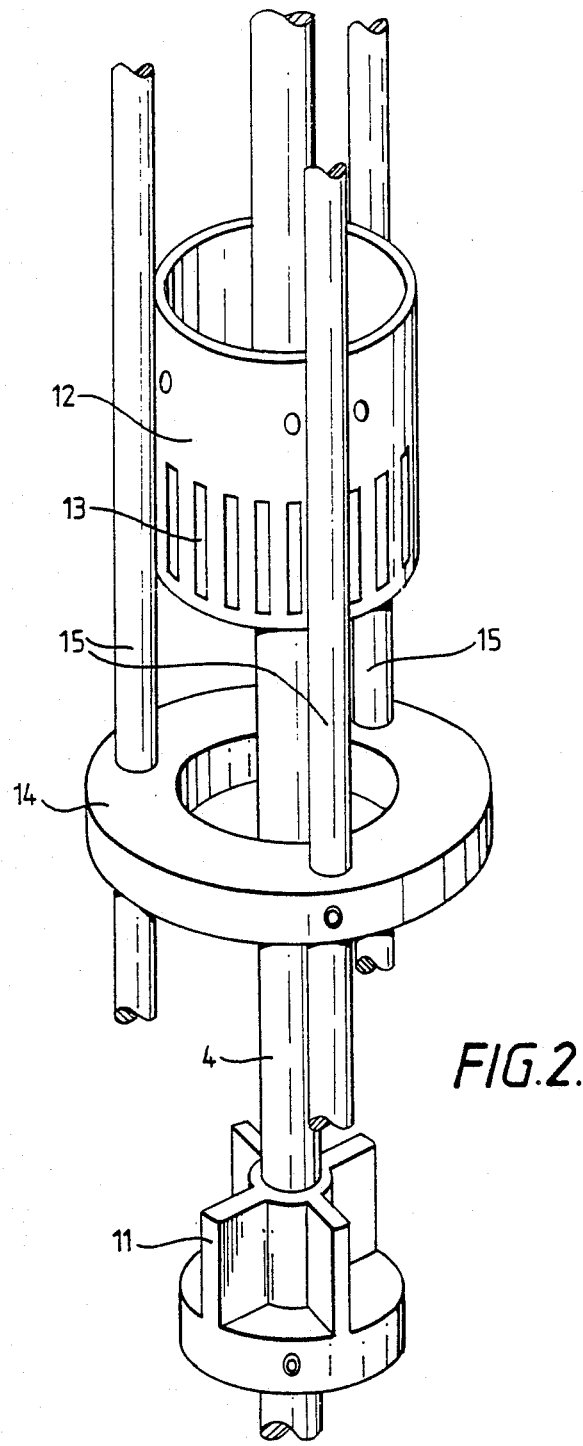
FIG. 2 shows detail of a mixer design suitable for vigorous agitation.

A continuous differential liquid-liquid contactor schematically illustrated in FIG. 1 was employed. Referring to FIG. 1, the column contactor was compartmentalised by means of stationary wall-mounted ring electrodes 2. Each compartment 3 was agitated by means of its own impeller assembly 1 mounted on a central rotating shaft 4. The nature of the impeller assemblies is illustrated in FIG. 2. The impeller 11 is fixed on the central rotating shaft 4 within an immobile slotted cage or shroud 12. The slots 13 impart shear forces on drops passing through them and minimise tangential flow. Slot size was chosen with due regard to the requirement for a finely dispersed system. The impeller 11 was located on the column axis by means of a support collar 14 fixed in position by three column length rods 15. The base of the shroud 12 rested on the support collar 14 and was steadied by three screws to the column length rods 15.

Figure 3:
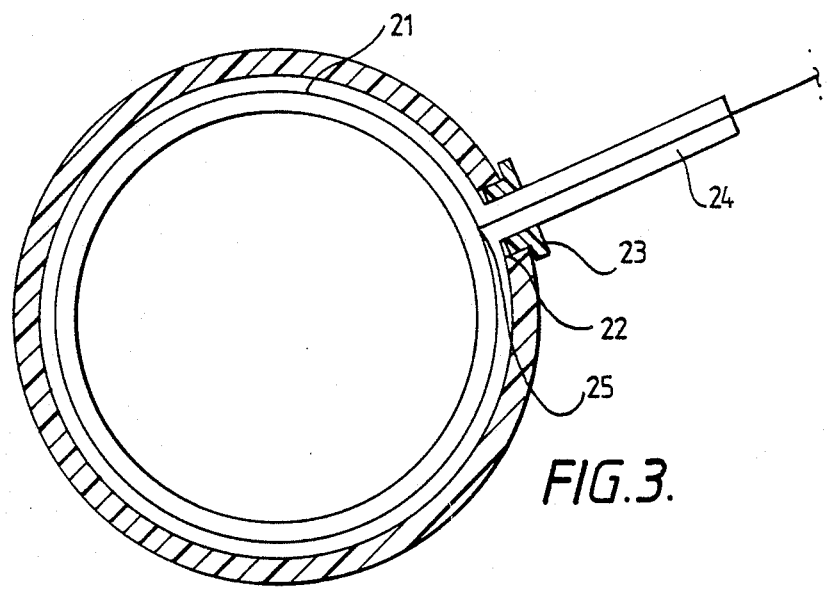
FIG. 3 shows an insulated electrode assembly.

Each electrode was of the form shown in FIG. 3. The electrodes were fabricated from PTFE insulated cable in the form of a ring the outer radius os which was the same as the inside wall of the column. This ensured that the wire core 21 of the electrode was electrically insulated from the liquid contents of the column and the column walls. The choice of PTFE insulated cable was one of convenience. The essential nature of the electrode is that it should be coated with dielectric material and other means of fabricating an electrode are visualised. The electrical connection between the ring electrode and the high voltage supply was achieved through a hole in the column wall 22 sealed with a PTFE plug 23 through which passed the supply cable 24. The junction 25 between the supply cable 24 and the wire electrode 21 was carefully coated with insulating material.

The relative positions adopted for mixer assemblies and electrodes were as shown schematically in FIG. 1. A section of the column showing the situation in detail is given in FIG. 4. The principle underlying the column design was that mixing and coalescence inducing internals should alternate down the column axis. The concept was to obtain as uniform a balance as possible between drop breakup and coalescence along the column length.

Figure 4:
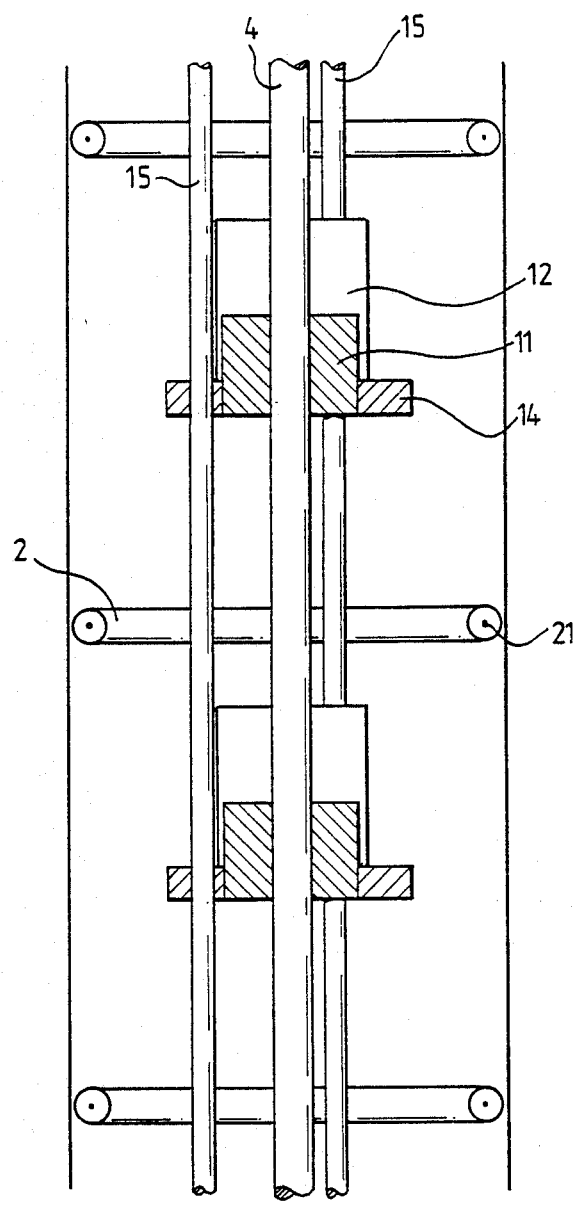
FIG. 4 shows section of an electrostatic/shear mix differential contactor.

FIG. 4 specifically refers to a column designed for use with the heavy phase dispersed; it would be inverted for the case where the light phase was dispersed. As illustrated, the flow into the mixing zone is over the rim of the shroud and therefore vigorous circulation is developed above the support collar. The impeller is mechanically isolated from the liquid immediately underneath the level of the support collar and thus the impeller induces no direct turbulence to the region below the collar. Dispersed phase gravitating down the column is drawn into the shroud and emerges through the slots in the shroud in the form of fine drops. These drops experience an electrostatic field by virtue of the difference in applied potential between the energised electrodes and the central earthed impeller shaft and mixing support assembly. The relative positions of the mixers and electrodes were chosen with due regard to the requirement for uniform operation down the column length, the mixers being placed approximately centrally in the region between two electrodes.

It is envisaged that the electrodes may be energised by pulsed uni-directional or alternating voltages. Both of these systems are known to successfully promote coalescence in "water-in-oil" type systems when used with insulated electrodes (European Patent Application No. 81305155.4, U.S. Pat. No. 4,039,404).

EXAMPLES

The invention will be more readily understood by referring to the examples below.

EXAMPLE 1

A 71 mm i.d. glass column was fitted with internals comprising five electrodes with four inter-spaced mixing elements such that the total effective column length was 320 mm. The mixer assembly was as illustrated in FIG. 2 with the following key dimensions:
impeller diameter 22 mm
inside shroud diameter 24 mm
support collar diameter 40 mm
impeller height 10 mm
shroud height 25 mm
shroud slots 1 mm×10 mm at 2 mm spacing The electrode was PTFE cable with the following dimensions:
cable core diameter 1 mm
insulation thickness 2 mm An additional electrode was included in the quiescent region at the top of the column. This was found to reduce entrainment of the dispersed phase in the continuous phase effluent.

The liquid system chosen for evaluating the column was:
dispersed phase—euqi-volume mixture of N-methyl pyrrolidone and ethylene glycol.
continuous phase—a commercial iso-paraffinic kerosene.

Pulsed DC fields were used to energise the electrodes at a frequency of 4 Hz for a range of voltages. The mark/space ratio for the nominally square wave pulses was unity.

With a volumetric phase flow ratio dispersed:continuous of 4:1 average dispersed phase hold-up was measured for a range of impeller speeds at a number of different applied voltage magnitudes. Pre-equilibrated liquid phases were used for this hydrodynamic work.

Figure 5:
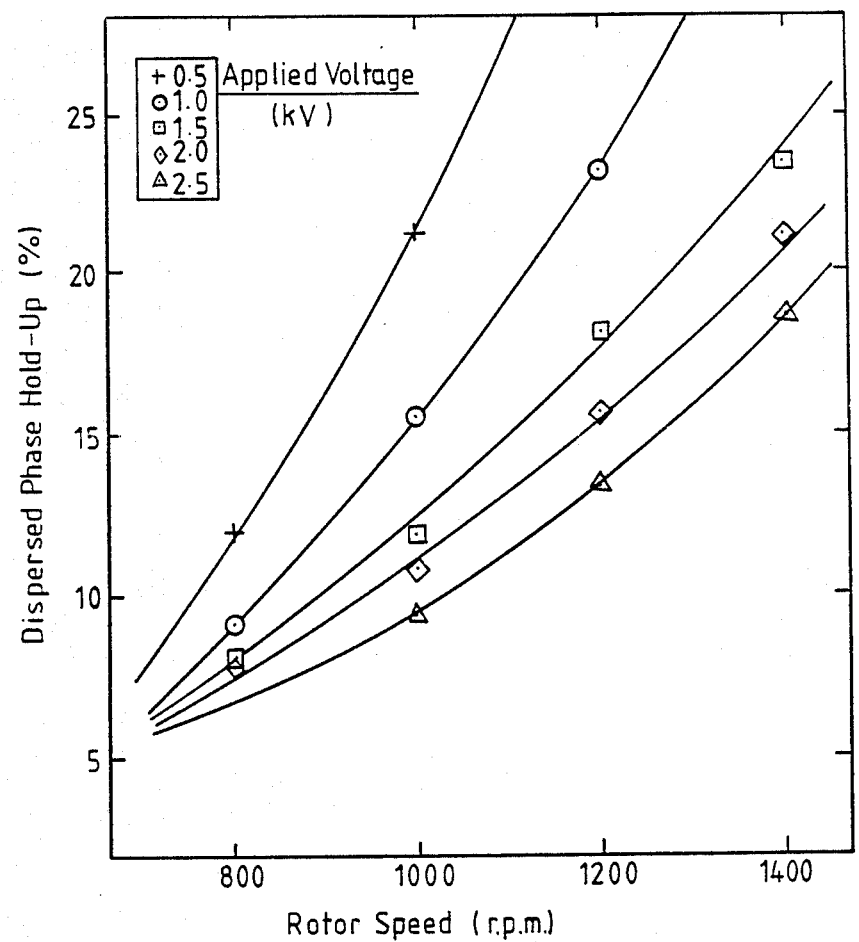
FIG. 5 illustrates the effect of applied voltage and rotor speed on dispersed phase hold-up (total loading 15.2 $m^3 m^{-2} h^{-1}$, Dispersed:Continuous=4:1)
Figure 6:
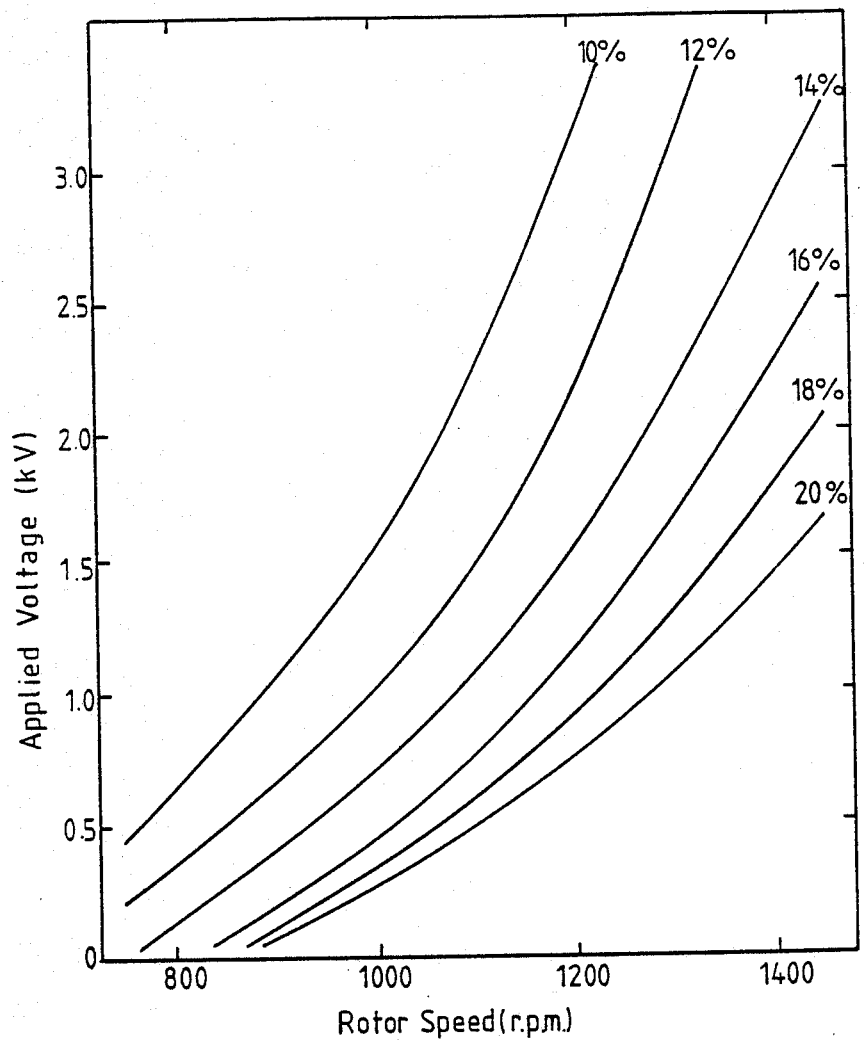
FIG. 6 illustrates lines of constant dispersed phase hold-up (total loading 11.4 $m^3 m^{-2} h^{-1}$, Dispersed:Continuous 5=4:1.

FIG. 5 indicates the results of this tudy for a total column throughput of 1.0 liter oper minute. It is apparent that the effects of impeller speed can be offset by the electric field such that hold-up is maintained constant. This confirms in hydrodynamic terms the concept of the present invention. Concurrent increases in impeller speed and applied voltage may be used such that the balance of coalescence and redispersion is ostensibly the same while the intensity of the cycle is markedly increased. This is further illustrated by FIG. 6 which shows for a different total throughput lines of constant hold-up. These lines were obtained by interpolation of data similar in form to those shown in FIG. 5.

EXAMPLE 2

This experiment used the same apparatus as that used in Example 1. The liquid system was identical to that used in Example 1 except that the continuous phase entered the column containing cumene (20% v/v) and mass transfer occurred into the dispersed phase. Analysis for cumene content was by GLC. A total throughput of 1.0 liter/minute was employed with the phase ratio and electrical pulse frequency as given in Example 1.

Experimental results for three runs are given in Table 1.

TABLE 1

| Impeller speed rpm | Applied voltage kV | Fractional dispersed phase hold-up | Height of a transfer unit m |
|---|---|---|---|
| 1000 | 1.0 | 0.143 | 0.360 |
| 1200 | 1.5 | 0.151 | 0.268 |
| 1400 | 2.0 | 0.149 | 0.134 |

The intensity of the coalescence-redispersion cycle referred to Example 1 would be expectred to correlate with mass transfer performance. The results given in Table 1 show that for intense cycles the plug flow height of a transfer unit is substantially reduced.

EXAMPLE 3

Conditions were as in Example 2, with transfer of cumene occurring. In this case impeller speed and applied voltage were maintained constant at 100 rpm and 1.5 kV, respectively. Total throughput was varied from 0.5 to 1.5 liter/minute and its effects upon column hydrodynamics and mass transfer performance were noted.

Figure 7:
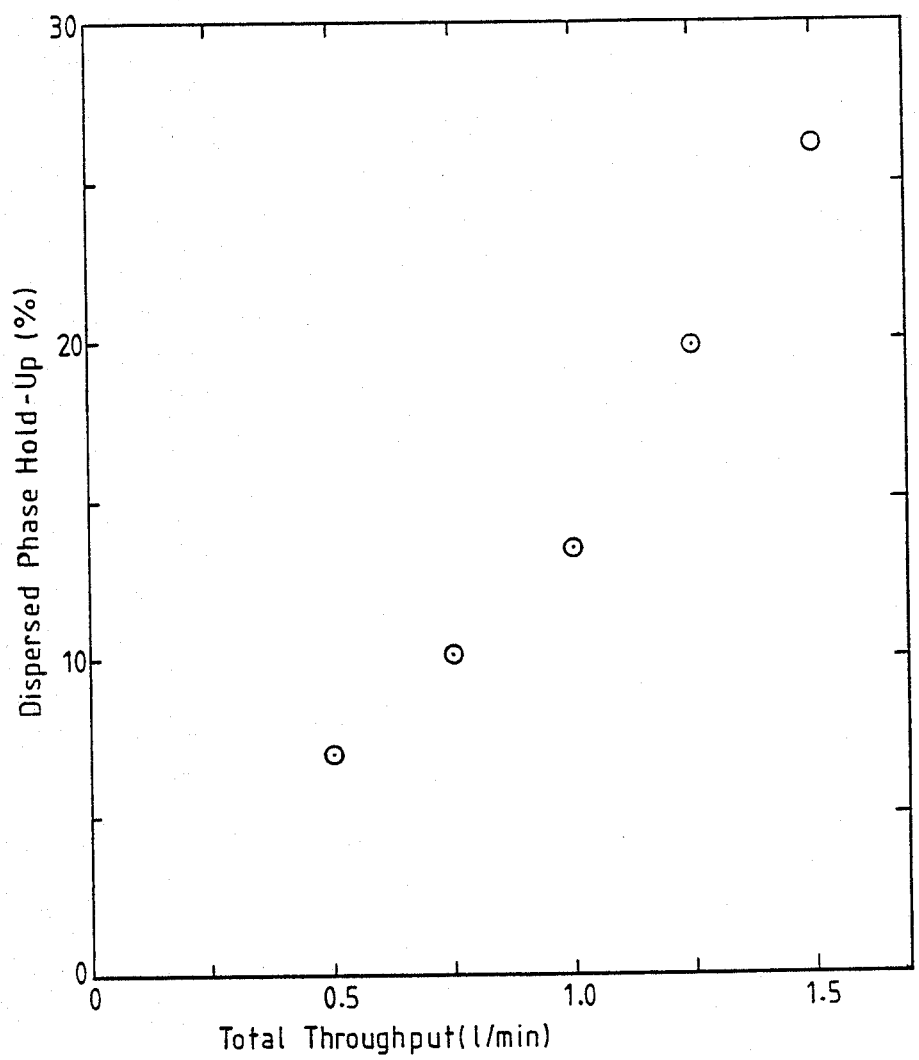
FIG. 7 shows the effect of column loading on dispersed phase hold-up under mass transfer conditions; and, FIG. 8 shows the effect of throughput upon plug flow height of a transfer unit.

FIG. 7 illustrates the expected trend in dispersed phase hold-up with increasing throughput.

Figure 8:
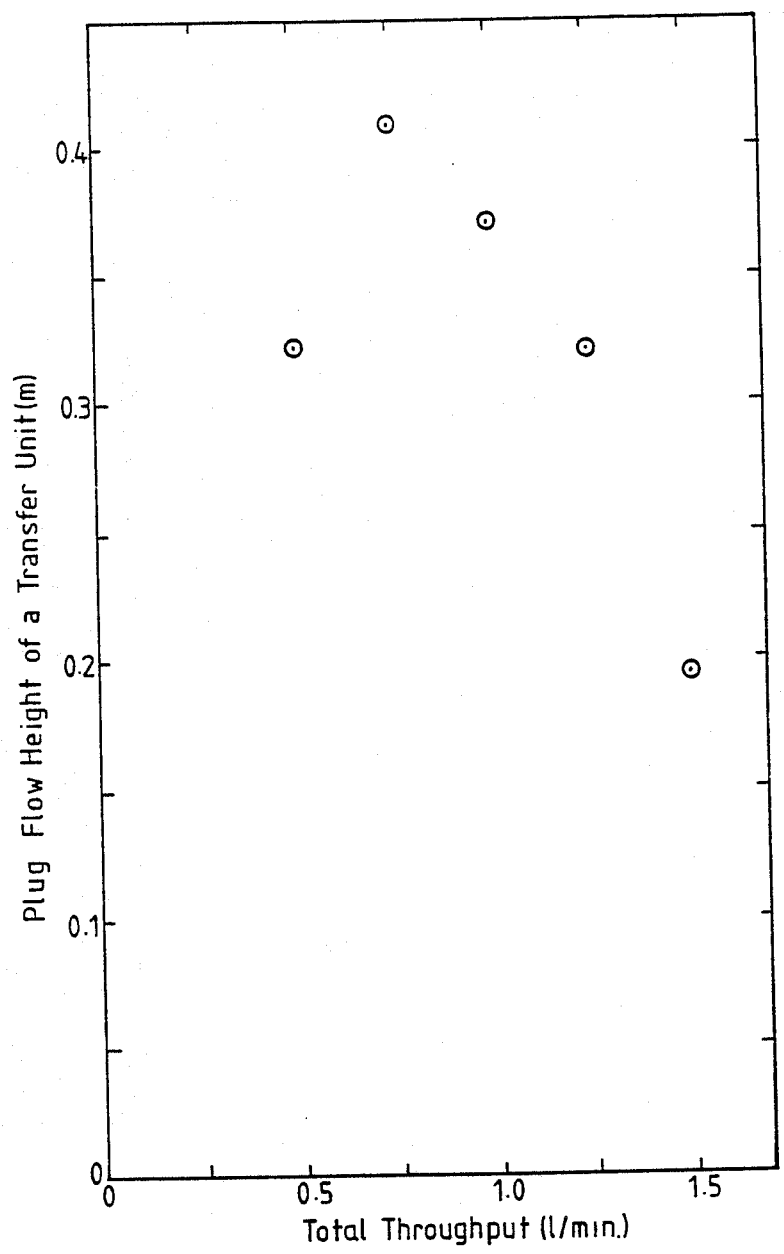

The influence of throughput on height of a transfer unit is shown in FIG. 8 for the flow domain investigated. The data show column mass transfer performance improving with throughput under the given electrical conditions. Ultimately this must be limited by flooding and the influence of axial mixing.

EXAMPLE 4

The equipment and liquid system used were the same as those for Example 1. Pulsed DC voltages of nominally square profile were again used to energise the electrodes, but now at a frequency of 10 Hz. Using pre-equilibrated liquids, volumetric phase flow ratio dispersed to continuous of 4:1 and the total column loading of 1.0 liter/minute, dispersed phase hold-up was measured. These are the same flow conditions as used for the experiments given to FIG. 5. The results are given in Table 2.

TABLE 2

| Impeller Speed rpm | Applied voltage kV | Fractional dispersed phase hold-up |
| --- | --- | --- |
| 800 | 0.0 | 0.247 |
| 800 | 1.0 | 0.212 |
| 800 | 3.0 | 0.134 |
| 800 | 5.0 | 0.117 |
| 1000 | 1.0 | 0.290 |
| 1000 | 3.0 | 0.220 |
| 1000 | 5.0 | 0.166 |
| 1200 | 3.0 | 0.354 |
| 1200 | 5.0 | 0.284 |
| 1400 | 5.0 | 0.410 |

We claim:

1. A method for effecting contact between two immiscible liquids having diffrent electrical conductivities, the method comprising mixing the two liquids so that the relatively more conductive liquid is dispersed within the less conductive liquid, and subjecting the dippersed mixture to mechanical agitation in a primary zone which reduces the droplet size of the dispersed phase and to the application of an electrostatic field to the reduced droplets in a secondary zone so as to cause coalescence of the droplets:

characterized in that the primary and secondary zones are located closely adjacent to each other;

and in that the primary zone is shrouded from the secondary zone so as to shroud the dispersed phase from the effect of the electrostatic field while the dispersed phase is being subjected to intense mechanical agitation in the primary zone.

2. A method according to claim 1, characterized in that the primary zone and the secondary zone are laterally adjaent to each other.

3. A method according to claim 2, characterized in that the primary zone and the secondary zone are separated by a cylindrical shroud, the primary zone being located within the cylindrical shroud.

4. A method according to claim 3, characterized in that an impeller is rotatably mounted within the shroud, and openings are formed in the wall of the shroud to permit the reduced droplets to be discharged radially outwardly from the primary zone to the secondary zone.

5. A method according to claim 2, characterized in that the secondary zone is defined between a pair of axially spaced electrode rings.

6. A method according to claim 1, characterized in that the electrostatic field is an AC field or a pulsed DC or AC field, in which the pulse frequency is up to 60 Hz.

7. A method according to claim 1, characterized in that the voltage gradient within the dispersion in the secondary zone is up to 1200 V/cm.

8. A method according to claim 1, characterized in that the two liquids are mixed by substantially continuous countercurrent contact.

9. A method according to claim 1, characterized in that the liquids are brought into contact for the purpose of effecting a liquid-liquid extraction therebetween.

10. A method according to claim 1, characterized in that the electrostatic field is generated by the application of a DC or AC voltage to an insulated electrode located concentrically with, but axially displaced from agitation means provided in said primary zone.

11. A method according to claim 10, characterized in that the liquids are caused to flow through a column within which are located said electrode and said agitation means.

12. A method according to claim 11, characterized in that a plurality of agitation means and a plurality of electrodes are provided, said agitation means and said electrodes alternating along said column.

13. Apparatus for effecting contact between two immiscible liquids having different electrical conductivities, the apparatus comprising means for mixing the two liquids so that the relatively more conductive liquid is dispersed within the less conductive liquid, means for subjecting the dispersed mixture to mechanical agitation in a primary zone which reduces the droplet size of the dispersed phase, and means for applying an electrostatic field to the reduced droplets in a secondary zone so as to cause coalescence of the droplets;

characterized in that the primary and secondary zones are closely adjacent to each other;

and in that the primary zone is shrouded from the secondary zone so as to shroud the dispersed phase from the effect of the electrostatic field while the dispersed phase is being subjected to intense mechanical agitation in the primary zone.

* * * * *